United States Patent [19]

Akao et al.

[11] Patent Number: 4,894,264
[45] Date of Patent: Jan. 16, 1990

[54] GUSSET BAG FOR PHOTOGRAPHIC PHOTOSENSITIVE MATERIALS

[75] Inventors: Mutsuo Akao; Koji Inoue; Hiroyuki Osanai, all of Kanagawa, Japan

[73] Assignee: Fuji Photo Film Co., Ltd., Minami-Ashigara, Japan

[21] Appl. No.: 186,470

[22] Filed: Apr. 26, 1988

[30] Foreign Application Priority Data

Apr. 28, 1987 [JP] Japan .................. 62-103156

[51] Int. Cl.$^4$ .................. B32B 3/04; B32B 15/04; B32B 27/08
[52] U.S. Cl. .................. 428/34.2; 428/35.3; 428/124; 428/130; 428/285; 428/286; 428/457; 428/458; 428/463; 428/464; 428/474.4; 428/476.9; 428/480; 428/515; 428/516; 428/518; 428/522; 206/524.2
[58] Field of Search ............ 428/35.3, 34.2, 124, 428/130, 285, 286, 457, 458, 461, 463, 464, 323, 328, 537.5, 474.4, 483, 476.9, 480, 515, 516, 518, 520, 522, 334, 335, 220; 206/524.2

[56] References Cited

U.S. PATENT DOCUMENTS

| 4,147,291 | 4/1979 | Akao et al. | 229/3.5 R |
|---|---|---|---|
| 4,258,848 | 3/1981 | Akao et al. | 428/461 |
| 4,331,725 | 5/1982 | Akao | 428/138 |
| 4,337,285 | 6/1982 | Akao et al. | 428/461 |
| 4,356,224 | 10/1982 | Akao et al. | 428/220 |
| 4,359,499 | 11/1982 | Akao et al | 428/461 |
| 4,386,124 | 5/1983 | Akao | 428/463 |
| 4,411,943 | 10/1983 | Akao | 428/161 |
| 4,411,945 | 10/1983 | Akao et al. | 428/216 |
| 4,436,809 | 3/1984 | Akao et al. | 428/220 |
| 4,452,846 | 6/1984 | Akao | 428/461 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/355 |
| 4,579,781 | 4/1986 | Akao | 428/461 |
| 4,584,234 | 4/1986 | Hirose et al. | 428/323 |
| 4,587,175 | 5/1986 | Akao | 428/461 |
| 4,629,640 | 12/1986 | Akao | 428/461 |
| 4,639,386 | 1/1987 | Akao | 206/316 |
| 4,653,640 | 3/1987 | Akao | 428/461 |
| 4,661,395 | 4/1987 | Akao | 428/461 |
| 4,661,401 | 4/1987 | Akao | 428/216 |
| 4,663,218 | 5/1987 | Akao | 428/461 |
| 4,687,692 | 8/1987 | Akao | 428/286 |
| 4,708,896 | 11/1987 | Akao | 428/480 |
| 4,730,778 | 3/1988 | Akao et al. | 206/389 |
| 4,778,712 | 10/1988 | Akao | 428/213 |
| 4,778,713 | 10/1988 | Akao | 428/215 |
| 4,784,906 | 11/1988 | Akao | 428/324 |
| 4,787,506 | 11/1988 | Akao | 206/395 |
| 4,796,823 | 1/1989 | Akao et al. | 428/98 |

Primary Examiner—Jose G. Dees
Assistant Examiner—James J. Seidleck
Attorney, Agent, or Firm—Burns, Doane, Swecker & Mathis

[57] ABSTRACT

A single-sheet gusset bag for photographic photosensitive materials formed of a laminated sheet comprising a metal foil layer or metallized flexible sheet layer, a water-absorptive, and heat-resistant flexible sheet layer which resists dust formation laminated on the outside of said metal foil layer or metallized flexible sheet layer, and a light-shielding polyolefin resin film layer containing at least linear low density polyethylene resin, carbon black and an antioxidant and having a thickness of more than 50 μm laminated on the inside of said metal foil layer or metallized flexible sheet layer, and the bottom seal portion is turned or rolled and fixed by an adhesive or adhesive tape.

4 Claims, 3 Drawing Sheets

GUSSET BAG FOR PHOTOGRAPHIC PHOTOSENSITIVE MATERIALS

BACKGROUND OF THE INVENTION

1. Field of the Invention

This invention relates to a gusset bag for photographic photosensitive materials, which is particularly useful for packaging large solid photographic photosensitive materials, such as a rolled photographic paper, a roll film, superposed sheet photographic films and superposed sheet photographic papers.

2. Description of the Prior Art

Gusset bags are widely utilized as packaging bags for packaging various things. It is known in the art to prepare gusset bags made of paper, thermoplastic resin film and laminated sheet including the laminated sheet where a thermoplastic resin film layer is disposed on the inside so as to be heat-sealable (Japanese Patent KOKOKU Nos. 56-30177 and 58-54030, Japanese Utility Model KOKOKU No. 57-3789, etc.). A method of sealing the lower end of the bag by adhesive tape is also known (Japanese Patent KOKAI No. 56-5757).

On the other hand, photographic photosensitive materials are necessarily packaged in a packaging bag capable of shielding light completely, because photographic photosensitive materials lose their values upon exposure to light. Particularly, in the case of a heavy voluminous photographic photosensitive material having sharp edges, such as a rolled photographic paper, the double-sheet gusset bag shown in FIG. 11 was used. This double-sheet gusset bag was composed of the outer sheet A consisting of unbleached kraft paper 7 containing a paper strength increasing agent such as melamine resin, polyacrylamide resin, alkylketone dimer, etc. and a light-shielding thermoplastic resin film layer 6a as the heat-sealing layer and the inner sheet B consisting of a light-shielding low density polyethylene (LDPE) resin film layer 6a, an aluminum foil layer 5, bleached kraft paper layer 1' and another light-shielding LDPE resin film layer 6ⓐ containing isobutylene rubber laminated in this order each through a LDPE resin adhesive layer 4. The light-shielding LDPE resin film layers 6a, 6ⓐ of the inner sheet B do not affect adversely the photographic photosensitive materials packaged therein. Though the outer sheet A has the ability to affect the photographic photosensitive materials adversely, such as by fogging, its physical strength is large. It is also thermostable, and its printability is excellent. Moreover, the turned or rolled top and bottom seal portions can be fixed by using an adhesive or adhesive tape. The inner sheet B was incorporated in order to shield the adverse effect of the outer sheet A, to secure physical strength, moistureproofness and antistatic properties, and to prevent curling. Another inner sheet employed was, for example, the laminated film composed of an aluminum foil layer and two uniaxially stretched high density polyethylene resin layers containing carbon black having a particular draw ratio laminated on both sides of the aluminum foil layer each through an adhesive layer so that their orientation axes cross each other (U.S. Pat. No. 4,331,725). Another inner sheet was composed of a metallized film and two low pressure linear low density polyethylene (L-LDPE) resin film layers containing a light-shielding material laminated on both sides of the metallized film each through an adhesive layer (U.S. Pat. No. 4,663,218). The difference in the thickness of both L-LDPE resin film layers was within 50%.

As described above, conventional gusset bags for packaging photographic photosensitive materials were double-sheet gusset bags composed of an outer sheet and an inner sheet having different properties in order to secure physical strength, heat resistance, printability, writing quality, wear resistance, adhesive properties and the like under the conditions not affecting the photographic photosensitive materials therein adversely. As a result, they have various disadvantages. That is, since two packaging sheets of the outer sheet and the inner sheet were used, the packaging cost became expensive. They made the package bulky, and transportation increased, particularly when the package wax exported. The inventory of the packaging materials increased so as to require a larger area for maintaining the inventory. The cost for inventory control, orders to a packaging material distributor, purchasing cost of raw materials were also raised. It was also a hard work to align both edges of the outer sheet and the inner sheet under a safety light so as to not impair the quality of photographic photosensitive materials and to set them so as to pass the prescribed position of the pass roll of the processing machine. Moreover, since there is a space between the outer sheet and the inner sheet, the heat-sealing temperature of the gusset bag was necessarily high because of low heat conductance. Furthermore, since the unbleached kraft paper was brown, the gusset bags were heated under the sunlight whereby the quality of the photographic photosensitive materials occasionally degraded. The printing, color and appearance of the gusset bags were not good, and moreover, the paper, adhesive tape and adhesive were sometimes separated. During transportation, paper powder was generated due to rubbing with corrugated board box, and adhered to the gusset bag. The paper powder adhered to the surface of the photographic photosensitive materials at the time of removal in a dark room, and caused spot-shaped development defects.

SUMMARY OF THE INVENTION

An object of the invention is to provide a gusset bag for photographic photosensitive materials excellent in the properties necessary for the gusset bag including physical strength, heat-sealing properties, moistureproofness, gas barrier, printability, sealability in the case of using an adhesive, wear resistance, heat resistance, antistatic property, light-shielding, sealability by adhesive tape and bag-making ability, which can effectively heat-sealed at a low temperature.

Another object of the invention is to provide a gusset bag for photographic photosensitive materials excellent in the properties necessary for the gusset bag and is compact.

Another object of the invention is to provide a gusset bag for photographic photosensitive materials excellent in the properties necessary for the gusset bag wherein the load of a bag-making worker in a dark room is decreased.

Another object of the invention is to provide a gusset bag for photographic photosensitive materials excellent in the properties necessary for the gusset bag which is inexpensive and which has a high commercial value.

Another object of the invention is to provide a gusset bag for photographic photosensitive materials excellent in the properties necessary for the gusset bag which does not generate dust due to wear during transportation.

Such objects have been achieved by a single-sheet gusset bag for photographic photosensitive materials formed of a laminated sheet comprising a metal foil layer or metallized flexible sheet layer, a water-absorptive, heat-resistant flexible sheet layer which resists dust formation laminated on the outside of said metal foil layer or metallized flexible sheet layer, and a light-shielding polyolefin resin film layer containing at least linear low density polyethylene resin, carbon black and an antioxidant and having a thickness of more than 50 μm laminated on the inside of said metal foil layer or metallized flexible sheet layer, and the bottom seal portion is turned or rolled and fixed by an adhesive or adhesive tape.

DETAILED DESCRIPTION OF THE INVENTION

Figure 1:
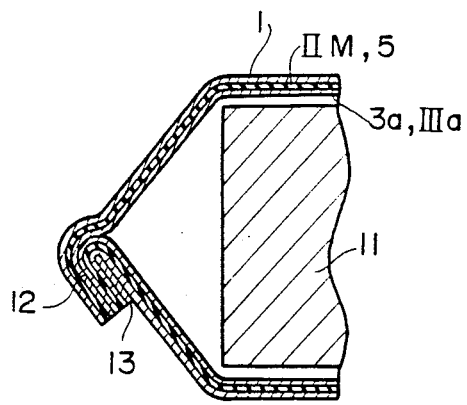
FIGS. 1 to 4 are partial sectional views of the top seal portion or bottom seal portion of the gusset bags embodying the invention.

A metal foil layer or a metallized flexible sheet layer is disposed as an intermediate layer of the laminated sheet forming the single-sheet gusset bag of the invention.

The metal foil includes aluminum foil, tin foil, iron foil, lead foil, thin steel sheet coated with zinc and thin metal sheet formed by electrolysis, having a thickness of 5 to 50 μm.

Hereinafter, a metallized flexible sheet which is particularly suitable for the laminated sheet forming the gusset bag of the invention is explained.

Metallization is carried out according to known methods, such as vacuum evaporation, sputtering, ion plating, or electron beam heating. The metallic membrane layer may be formed one face or both faces of the flexible sheet layer.

The metallic membrane layer may be formed of a pure metal such as Al, Sn, Zn, Co, Cr, Ni, Fe, Cu, etc., alloys thereof, or any other metals of which a metallic membrane layer can be made, but aluminum is the most preferable in terms of processing and cost.

The thickness of the metallic membrane layer to be metallized is 55–1200 Å. When the thickness is thinner than 55 Å, antistatic property of the film is insufficient. Moreover, in order to secure moistureproof and light-shielding properties, the thickness of the other flexible sheet layer and the light-shielding polyolefin resin film layer must be increased. On the other hand, when the thickness is greater than 1200 Å, degradation of the flexible sheet occurs by the heat of metallizing, and the strength of the laminated film to be produced decreases. In the case of aluminum-metallized membrane, preferable thickness is greater than 70 Å, more preferably 80 to 800 Å, further more preferably 100 to 600 Å.

The flexible sheet to be metallized is thin (5 to 70 μm in thickness), and it is superior in physical strength, moisture-proofing and gas barrier. The flexible sheet suitable for the invention includes various papers, synthetic papers, cellophane and thermoplastic resin films, having a thickness of 8 to 40 μm, and particularly preferable flexible sheets are polypropylene films, polyester films, high density polyethylene films, polyamide films, polystyrene films and the films of the blended resins of one or more of these resins and other resins, having a thickness of 10 to 30 μm and being uniaxially or biaxially oriented. Unstretched polypropylene films are also preferable because of large physical strength and inexpensiveness. The extremely thin reinforced films made of a high density polyethylene of which the blow-up ratio is large is particularly preferable because of large physical strength and inexpensiveness. In addition, aluminum metallized paper is also preferable.

A protective layer may be provided on the metallic membrane layer, if necessary. Materials usable for the protective layer include butyral resin, acrylic resin, cellulose resins such as cellulose acetate resin, urethane resin, epoxy resin, polyester resin, ionomer resin, ethylene-ethyl acrylate copolymer resin, various polyethylene resins and various polypropylene resins. Wax, gelatin and polyvinyl alcohol are also usable. The thickness of the protective layer is made extremely thin such as thinner than 50 μm, preferably thinner than 5 μm, in order to eliminate static electricity effectively. Such a protective layer may be formed by a known solution coating or spray coating. A conductive material such as an antistatic agent, carbon black, a metal powder such as aluminum powder or aluminum paste or carbon fiber may be added to the flexible sheet to be metallized, the other flexible sheet, the light-shielding polyolefin resin film layer, an adhesive layer or the protective layer, and thereby, elimination of static electricity is ensured.

The water-absorptive, heat-resistant flexible sheet layer which resists dust formation may be composed of white glassine paper, coated paper, lintfree paper, cellophane, synthetic pulp-blended paper, nonwoven fabric, resin saturated paper, synthetic paper, water-repellent paper, calendered paper, or the like. Preferable flexible sheets are white or transparent, such as white glassine paper, cellophane, synthetic pulp-blended paper, surface sized paper, saturated paper, coated paper, supercalendered bleached kraft paper, neutral paper, synthetic paper and nonwoven fabric, and the like, and neutral paper and processed bleached kraft paper is particularly preferable in view of heat resistance, printability and no influence upon photographic photosensitive materials. The flexible sheet layer is disposed so as to become the outer surface of the gusset bag, and its thickness is usually about 8 to 150 μm.

The above flexible sheet is laminated on the aforementioned metal foil layer or metallized flexible sheet layer through an adhesive layer. The adhesive is able to adhere to both layers to be joined, and is selected from a thermoplastic resin melting adhesive including polyolefin resin adhesives, hot melt type gum adhesives and solution type adhesives. The polyolefin resin adhesives include a homopolymer and a copolymer of an olefin such as various polyethylene resins, polypropylene resins, polybutene resins and ethylene-propylene copolymer resins and L-LDPE resin, copolymer resins of an olefin and another monomer such as ethylene-vinyl acetate copolymer resin, ethylene-ethyl acrylate copolymer resin, ethylene-acrylic acid copolymer resin, various ionomer resins ("SURLYN" Dupont, "Himiran" Mitsui Polychemicals Co., Ltd., etc.) and graft copolymer resins. The solution type adhesives are divided into adhesives for wet lamination and adhesives for dry lamination. The adhesives for wet lamination are emulsion or latex. Examples of the emulsion-type adhesives are polyvinyl acetate resin emulsion, the emulsion of vinyl acetate-ethylene copolymer resin, the emulsion of vinyl acetate-acrylate ester copolymer resin, the emulsion of vinyl acetate-maleate ester copolymer resin, the emulsion of acrylic copolymer resin and the emulsion of ethylene-acrylic acid copolymer resin. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination are paraffin wax, microcrystalline wax, ethylene-vinyl acetate copolymer, ethylene-ethylacrylate copolymer and blends thereof. Pressure-sensitive adhesives and temperature-sensitive adhesives may also be employed. The melting point of the adhesive employed is preferably at least 5° C. lower than the melting point of the flexible sheet to be coated in order to laminate without adverse effect upon the flexible sheet coated by thermal melt adhesion. The thickness of the adhesive layer formed by extrusion laminating using a thermoplastic resin is usually 7 to 300 μm, preferably 10 to 100 μm. However, it is determined by considering cost, coating speed, total thickness of the laminated sheet, etc., and it is not restricted to the above range.

The light-shielding polyolefin resin film layer is disposed as the inner surface layer, is a heat sealing layer, and contains at least L-LDPE resin, carbon black and an antioxidant.

The L-LDPE resin is a copolymer of ethylene and α-olefin and it has a linear structure having short branches. The number of carbon atoms of the α-olefin is 3–13, preferably 4–10, more preferably 6–8, and examples are butene-1, 4-methylpentene-1, hexene-1 and octene-1. Preferable α-olefins are 4-methylpentene-1, hexene-1, heptene-1 and octene-1. Suitable ethylene content of L-LDPE is 85–99.5 mol. %, i.e. α-olefin content is 0.5–15 mol. %, and preferable ethylene content is 90–99.5 mol. %, i.e. α-olefin content is 0.5–10 mol. %. The density is usually in the range of 0.87–0.94 g/cm$^3$ (ASTM D-1505), and the melt index (M.I.) is preferably 0.8–30 g/10 minutes (ASTM D-1238). Such a L-LDPE resin is manufactured by solution method, slurry method, vapor phase method, or modified high pressure method. Examples of L-LDPE resin are "UNIPOLE" (trade name, UCC), "DOWLEX" (trade name, Dow Chemical Co., Ltd.), "STAMILEX" (trade name, DSM), "SUCLEAR" (trade name, Dupont de Nemour, Canada), "MARLEX" (trade name, Phillips Co., Ltd.), "ULTZEX" and "NEOZEX" (trade name, Mitsui Petroleum Chemical Industries Co., Ltd.) and "NISSEKI LINIREX" (trade name, Nippon Petrochemicals Co., Ltd.).

The content of L-LDPE resin in this film layer is more than 40 wt. %, preferably more than 50 wt. %, further preferably more than 60 wt. %. The L-LDPE resin is superior in strength, but it is inferior in terms of processing. By blending other resins, the problem of processing is improved, and furthermore, tear strength, heat seal strength and Gelbo test strength are remarkably increased. The upper limit of the content is 99.5 wt. % or less, and it is different according to the kind of the resin, etc.

As the resin to be blended with L-LDPE resin, homopolpropylene resin, propylene-ethylene random copolymer resin, propylene-ethylene block copolymer resin, LDPE resin, HDPE resin, EVA resin, EEA resin, polyisobutylene resin, etc. can be blended to the extent so far as its fundamental characteristics are not changed.

When carbon black is blended with a polyolefin resin such as LDPE resin, the physical strength generally decreases. Whereas, in contrast, in the case of L-LDPE resin, the physical strength increases by blending carbon black. The effect of carbon black clearly appears at 1 wt. %, and remarkably appears at more than 3 wt. %. However, lumps the occurrence of increases, with the amount of carbon black. When its content exceeds 30 wt. %, the lumps significantly increase and pinholes also occur. In order to inhibit the generation of the lumps, the blending of an antioxidant is effective. As the packaging material for photosensitive materials, moistureproofness, flatness, strength of film surface, heat seal ability and contamination of a photosensitive material are also problems. Accordingly, when these problems are also taken into consideration, a suitable content of carbon black is in the range of 0.1 to 15 wt. %, and the range of 3 to 7 wt. % is particularly preferable. Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic character, they are also preferable, though they are expensive. They may be blended with oil furnace black in order to improve its character. Suitable pH of carbon black is from 5 to 9, particularly from 6 to 8, and a suitable mean particle size is 10 to 50 μm. Particularly, the oil furnace carbon black or the acetylene black having pH 6 to 9 and mean particle size of 15 to 30 mμ are preferable. By using the carbon black of such pH and particle size, the gusset bag having the following merits is obtained. That is, the occurrence of fogging is rare, increase or decrease of photosensitivity scarcely happens, light-shielding ability is large, and the lumps of carbon black and pinholes such as fish eyes are hardly generated. In the gusset bag of the invention, carbon black is blended into the polyolefin resin film layer to touch the photosensitive materials to be packaged. By this location, the carbon black effectively shields light, it prevents the occurrence of blocking, it gives slipping character, and it exhibits antistatic properties.

The antioxidant is added in order to inhibit the generation of lumps caused by thermal degradation of resin. This antioxidant may be a phenol antioxidant, a sulfur-containing antioxidant or a phosphorus-containing antioxidant. The phenol antioxidants include n-octadecyl-3-(3',5'-di-t-butyl-4'-hydroxyphenyl)propionate, 2,6-di-t-butyl-4-methylphenol, 2,6-di-t-butyl-p-cresol, 2,2'-methylenebis(4-methyl-6-t-butylphenol), 4,4'-thiobis (3-methyl-6-t-butylphenol), 4,4'-butylidenebis (3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris (3,5-di-t-butyl-4-hydroxybenzyl)benzene and tetrakis [methylene-3-(3',5'-di-t-butyl-4'-hydroxyphenyl)propionate]methane. The sulfur-containing antioxidants include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite.

Particularly effective antioxidants are 2,6-di-t-butyl-p-cresol (BHT), low volatile high molecular weight phenol antioxidant ("Iraganox 1010", "Iraganox 1076", trade names of Ciba-Geigy AG, "Topanol CA", trade name of I.C.L., "Ionox 330" trade name of Shell), dilaurylthiodipropionate, distearylthiodipropionate and dialkylphosphate.

Two or more antioxidants may be combined. The content of the antioxidant is usually 0.001 to 1 wt. %. In the case that two or more antioxidants are added, the above content is the total amount. When the content is less than 0.001 wt. %, the effect of blending does not appear. While, when the content is more than 1 wt. %, the photographic film placed in such a gusset bag is adversely influenced by the antioxidant. Accordingly, a lower content in the range capable of preventing the generation of lumps and coloring is preferable. When the resin of the polyolefin resin film layer contains another or more resins such as LDPE resin in addition with L-LDPE resin, the antioxidant may be blended to either or both of the L-LDPE resin and the other resin(s). Furthermore, the effect of the antioxidant synergistically appears by blending it together with carbon black.

Various additives may be added to the polyolefin resin film layer. Examples of the additives are described below.

(1) Stabilizer; lead compounds, cadmium compounds, zinc compounds, alkaline earth metal compounds, organic tin compounds, etc.

(2) Antistatic agent; cationic surfactants, anionic surfactants, nonionic surfactants, ampholytic surfactants, etc.

(3) Filler; alumina, kaolin, clay, calcium carbonate, mica, talc, titanium oxide, silica, etc.

(4) Reinforcing agent; glass lobing, metallic fiber, glass fiber, glass milled fiber, carbon fiber, etc.

(5) Coloring agent; inorganic pigments (Al, $Fe_2O_3$, $TiO_2$, Zno, CdS, etc.), organic pigments (carbon black, etc.), dyes, etc.

(6) Deterioration preventing agent; ultraviolet absorber, metal deactivator, peroxide decomposing agent, etc.

(7) Lubricant; paraffin wax, fatty acids, fatty acid amides, esters, higher alcohols, etc.

(8) Coupling agent; silane compounds, titanium compounds, chromium compounds, aluminum compounds, etc.

(9) Various thermoplastic resins, rubbers

The light-shielding polyolefin resin film layer may be coextruded together with another thermoplastic resin film layer to form a coextruded multilayer film layer consisting of two or more layers. Even in such a case, the light-shielding polyolefin resin film layer should be disposed as the inner surface layer acting as a heat seal layer of the laminated sheet. The resin coextruded with the light-shielding polyolefin resin film layer may be polyethylene resin such as L-LDPE resin, LDPE resin, HDPE resin or MDPE resin, homopolypropylene resin, propylene-ethylene random copolymer resin, propylene-ethylene block copolymer resin, EVA resin, EEA resin, EAA resin, polyisobutylene resin, polyamide resin such as nylon 6, nylon 6—6 or nylon 12, saponified EVA resin, polybutene-1, polyester resin, ionomer resin, polyvinylidene chloride resin, polyacrylonitrile resin, polystyrene resin, a modified resin of one of these resins, a graft copolymer resin containing one of these resins, a crosslinked resin or a blended resin of two or more of the above resins.

The thickness of the light-shielding polyolefin resin film layer is greater than 50 μm, usually 50 to 200 μm, particularly 60 to 150 μm. When this film layer is coextruded, its thickness is greater than 15 μm, preferably greater than 25 μm, and the total thickness of the coextruded layer is greater than 50 μm, usually 50 to 200 μm, particularly 60 to 150 μm.

The light-shielding polyolefin resin film layer is laminated on the other side of the metal foil layer or metallized flexible sheet layer, i.e. the opposite side to the aforementioned flexible sheet layer. The adhesive used for the adhesive layer may be selected from the aforementioned ones.

The total thickness of the laminated sheet having such a composition is usually 70 to 500 μm, particularly 90 to 300 μm.

The gusset bag of the invention is a single-sheet gusset bag, and it is made by the following process. First, both sides of the above laminated sheet are joined to form a cylinder by back lining using a heat sealer or any other known sealing method for bag-making, so that the light-shielding polyolefin resin film layer is set on the inside. The one open end of the cylinder is completely sealed in band shape and cut in a prescribed length by heat cut sealing, and the end portion is turned or rolled. The number of turning times may be once or twice. The end is fixed by an adhesive or adhesive tape to complete the bottom seal portion. The photographic photosensitive materials to be packaged is inserted into the bag. The upper end is turned or rolled, and the end is fixed by an adhesive or adhesive tape to complete the top seal portion. Thus, the packaging process is finished. In the case of conventional double-sheet gusset bag, both ends must be rolled in order to secure a sufficient seal. Whereas, in the case of the gusset bag of the invention, it is sufficient that both heat-sealed ends are merely turned and the faces opposite to each other are joined by an adhesive. Various other known sealing methods for bag-making are also utilizable instead of heat sealing.

In the gusset bag of the invention, the water-absorptive, heat-resistant flexible sheet layer which resists dust information improves heat sealability, and raises the strength of the heat-sealed portion. This layer also makes the use of inexpensive and easily obtainable water-soluble ink, hot-melt adhesive and water-soluble adhesive possible. Since this layer resists dust information, the generation of dust by vibration or rubbing during transportation is minimized. Therefore, the spot-shape development troubles caused by dust adhesion are remarkably decreased. Since the adhesive and adhesive tape fixing the bottom seal portion and top seal portion hardly separate, the roll time can be reduced, and thereby, the amount of packaging materials is saved. By locating the light-shielding polyolefin resin film layer as the inner surface heat-sealing layer, carbon black improves physical strength, light-shielding, film moldability and antistatic property. It also synergistically increases the oxidation inhibition by the antioxidant. The antioxidant prevents discoloring, and it also synergistically prevents the generation of lumps together with the carbon black. Furthermore, since the polyolefin resin film layer contains L-LDPE resin, the laminated film is excellent in hot tack properties, sealability with contrasting materials, heat seal strength and elapsed heat seal strength. These heat sealing properties are superior to natural L-LDPE resin due to the synergistic effect of carbon black, antioxidant and L-LDPE resin.

When the single-sheet gusset bag of the invention is compared with conventional double-sheet gusset bags, the number of packaging sheets can be decreased from two sheets to one sheet without reducing physical strength. As a result, the number of laminating processes and the number and amount of raw materials are decreased. The package becomes compact, and transportation costs are reduced. Bag-making ability is also improved. Since the edges of the sheet do not have to be aligned under a safety light, the loss of packaging material decreases. The heat sealing temperature can remarkably be lowered. The transportation costs and inventory costs including inventory control costs are significantly reduced. The laminated sheet can easily be set so as to pass the prescribed position of pass roll, and bag-making speed can be increased. Since the appearance is white or silver, the package resists heating under the sunlight, and thereby, the photographic photosensitive materials therein are hardly degraded.

EXAMPLES

The laminated sheets shown in FIGS. 5 to 9 are used for the gusset bag of the invention.

Figure 5:
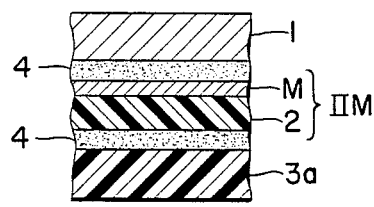
FIGS. 5 to 9 are partial sectional views of the laminated sheets used for gusset bag of the invention.

The laminated sheet of FIG. 5 is composed of metallized flexible sheet layer IIM consisting of metal membrane M and flexible sheet 2, water-absorptive, dust resistant heat-resistant flexible sheet layer 1 laminated thereon through adhesive layer 4 and light-shielding polyolefin resin film layer 3a laminated under metallized flexible sheet layer IIM through adhesive layer 4.

Figure 6:
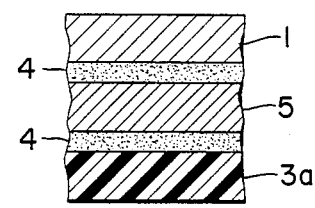

The laminated sheet of FIG. 6 is the same as the laminated sheet of FIG. 5, except that metal foil layer 5 is laminated instead of metallized flexible sheet layer IIM.

Figure 7:
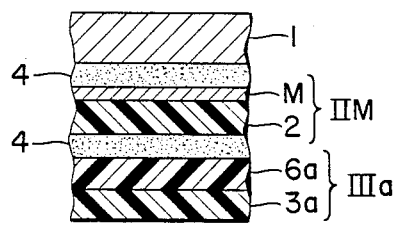

The laminated sheet of FIG. 7 is the same as the laminated sheet of FIG. 5, except that light-shielding coextruded polyolefin resin film layer IIIa consisting of light-shielding thermoplastic resin film layer 6a and light-shielding polyolefin resin film layer 3a is laminated instead of light-shielding polyolefin resin film layer 3a.

Figure 8:
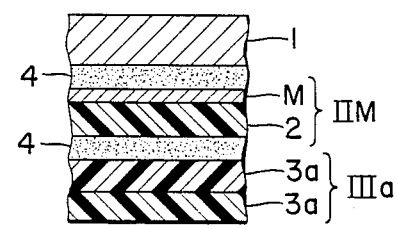

The laminated sheet of FIG. 8 is the same as the laminated sheet of FIG. 5, except that light-shielding coextruded polyolefin resin film layer IIIa consisting of two light-shielding polyolefin resin film layers 3a, 3a is laminated instead of light-shielding polyolefin resin film layer 3a.

Figure 9:
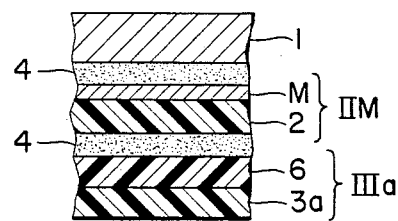

The laminated sheet of FIG. 9 is the same as the laminated sheet of FIG. 5, except that light-shielding coextruded polyolefin resin film layer IIIa consisting of thermoplastic resin film layer 6 and light-shielding polyolefin resin film layer 3a is laminated instead of light-shielding polyolefin resin film layer 3a.

Figure 10:
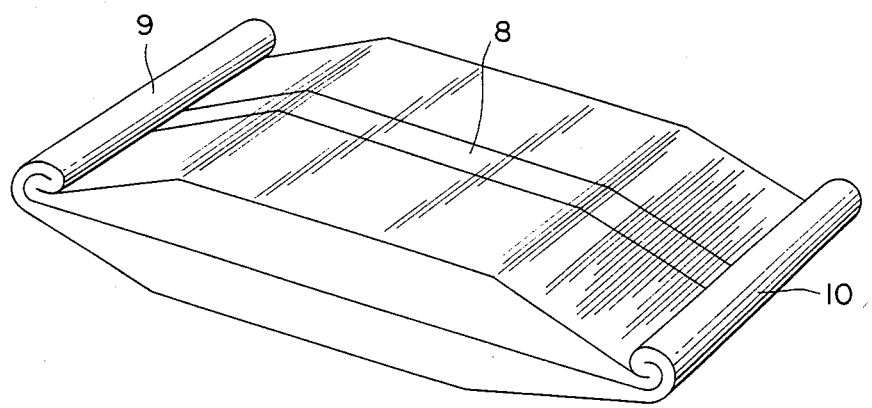
FIG. 10 is a perspective view of a gusset bag of the invention.

The gusset bag shown in FIG. 10 is used for packaging a roll of color photographic printing paper having sharp edges. Both sides of the laminated sheet are joined by back lining by a heat sealer to form center seal portion 8. The upper end and the lower end are heat-sealed, and rolled. Each rolled end is fixed by an adhesive and/or an adhesive tape to form top seal portion 9 and bottom seal portion 10.

Examples of the structure of top seal portion 9 and bottom seal portion 10 are illustrated in FIGS. 1 to 4.

In the case of FIG. 1, after the insertion of a roll of color photographic printing paper 11, the upper end is heat-sealed in band shape. The heat-sealed portion 12 is turned in the lower direction, and fixed onto the under surface of the gusset bag by using adhesive 13.

Figure 2:
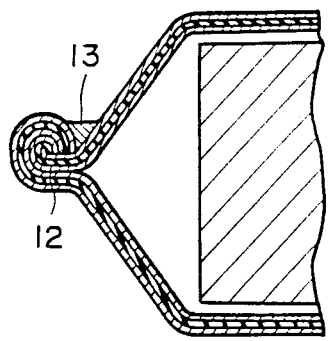

In the case of FIG. 2, the band-shaped heat-sealed portion 12 is rolled in the upper direction, and the end is fixed by adhesive 13.

Figure 3:
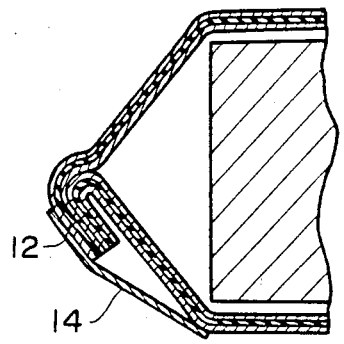

In the case of FIG. 3, the turned heat-sealed portion 12 is fixed by adhesive tape 14 instead of adhesive 13.

Figure 4:
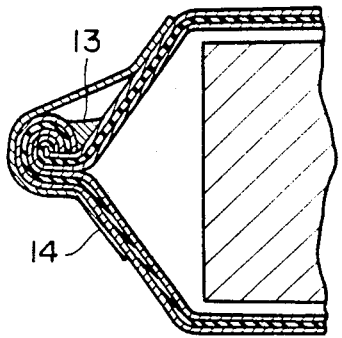

In the case of FIG. 4, the rolled end is fixed by adhesive 13 and adhesive tape 14.

Subsequently, various properties of three examples of the gusset bag of the invention were measured, and compared with a comparative gusset bag and a conventional gusset bag.

The gusset bag of the invention was a single-sheet gusset bag, and formed of the laminated sheet shown in FIG. 5. The water-absorptive, dust resistant and heat-resistant flexible sheet layer 1 was white glassine paper having an areal weight of 31 g/m$^2$. The metallized flexible sheet layer IIM was vacuum metallized biaxially stretched nylon film consisting of biaxially stretched nylon film 15 μm in the thickness and aluminum membrane 400 Å in thickness. The light-shielding polyolefin resin film layer 3a consisted of 71.87 wt. % of L-LDPE resin of which α-olefin was 4-methylpentene-1, 20 wt. % of HDPE resin having a density of 0.954 g/cm$^3$, 5.0 wt. % of LDPE resin, 3.0 wt. % of oil furnace carbon black, 0.1 wt. % of oleic acid amide lubricant and 0.03 wt. % of phenolic antioxidant, having a thickness of 80 μm. Each of the two adhesive layers 4, 4 consisted of 70 wt. % of L-LDPE resin of which α-olefin was butene-1 and 30 wt. % of LDPE resin having a thickness of 15 μm. The turned part of bottom seal portion was fixed by EEA resin hot-melt adhesive, and the turned part of top seal portion was fixed by cellophane adhesive tape.

The gusset bag of the invention II was the same as the invention I, except that the water-absorptive, dust resistant and heat-resistant flexible sheet layer was clay-coated paper having an areal weight of 50 g/m$^2$.

The gusset bag of the invention III was a single-sheet gusset bag, and formed of the laminated sheet shown in FIG. 8. The water-absorptive, dust resistant and heat-resistant flexible sheet layer 1 was polyvinylidene chloride-coated (K coat) cellophane 20 μm in thickness. The light-shielding coextruded polyolefin resin film layer IIIa 80 μm in thickness consisted of two light-shielding polyolefin resin film layers 3a, 3a molded by a double layer coextrusion inflation film molding machine. One light-shielding polyolefin resin film layer 3a 40 μm in thickness has the same resin composition as the light-shielding polyolefin resin film layer 3a of the invention I, and disposed on the side of the metallized flexible sheet layer IIM. The other light-shielding polyolefin resin film layer 3a 40 μm in thickness has the same resin composition as the light-shielding polyolefin resin film layer 3a of the invention I except that the HDPE resin was replaced by another HDPE resin having a density of 0.964 g/cm$^3$, and disposed as the inner surface layer. The metallized flexible sheet layer IIM and the adhesive layers 4, 4 were the same as the invention I.

Comparative gusset bag I was the single-sheet gusset bag of invention I, except that unbleached kraft paper having a areal weight of 50 g/m$^2$ was used instead of the white glassine paper.

Conventional gusset bag I was a double-sheet gusset bag shown in FIG. II. The inner sheet B consisted of a light-shielding LDPE resin film layer 6a 50 μm in thickness containing 3 wt. % of carbon black disposed as the inner surface layer, an aluminum foil layer 5 having a thickness of 7 μm laminated thereon through a LDPE resin adhesive layer 4 having a thickness of 15 μm, a bleached kraft paper layer 1' having an areal weight of 35 g/m² laminated thereon through a LDPE resin adhesive layer 4 having a thickness of 15 μm and a light-shielding synthetic rubber-containing LDPE resin film layer 6ⓐ 50 μm in thickness consisting of 67 wt. % of LDPE resin, 30 wt. % of isobutylene rubber and 3 wt. % of carbon black laminated thereon through a LDPE resin adhesive layer 4. The outer sheet A consisted of an unbleached kraft paper layer 7 having an areal weight of 70 g/m² disposed as the outer surface layer and a light-shielding LDPE resin extrusion laminated layer 6a 35 μm in thickness containing 3 wt. % of oil furnace carbon black.

The properties of these gusset bags were measured, and shown in Table 1.

occurrence of pinholes, etc. at the time of packaging a roll of color photographic printing paper being 8.9 cm in width and 180 m in length in each gusset bag under safety light in a dark room.

Cost Ratio:

The manufacturing cost per 1 m² of the laminated film of Conventional gusset bag I was set at 100.

We claim:

1. A single-sheet gusset bag of multilayer construction for photographic photosensitive materials comprising a metal foil layer or metallized flexible sheet layer, a water-absorptive, and heat-resistant flexible sheet layer which resists dust formation selected from the group consisting of white glassine paper, coated paper, dustless paper, cellophane, synthetic pulp-blended paper, nonwoven fabric, resin saturated paper, synthetic paper, neutral paper, water-repellent paper and calen-

TABLE 1

Figure 11:
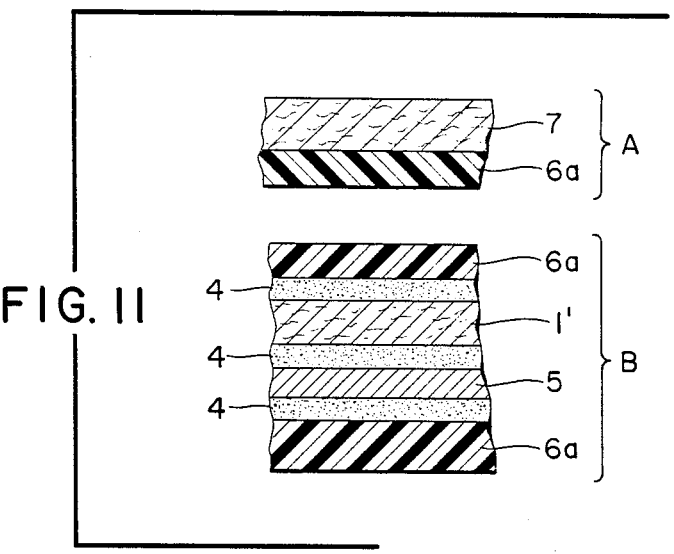
FIG. 11 is a partial sectional view of the inner sheet and outer sheet used for a conventional gusset bag.

|  | Product of the Invention | | | Comparative | Conventional |
|---|---|---|---|---|---|
|  | I | II | III | Product I | Product I |
| Layer Composition Flexible Sheet | FIG. 5 31 g/m² White Glassine Paper | FIG. 5 50 g/m² Clay-Coated Paper | FIG. 8 20 μm K Coat Paper | (FIG. 5) 50 g/m² Unbleached Kraft Paper | FIG. 11 Outer 70 g/m² Unbleached Kraft Paper Inner 35 g/m² Bleached Kraft Paper |
| Metal Foil or Metallized Layer | Al-Metallized Nylon Film | 50 g/m² Clay-Coated Paper | 20 μm K Coat Paper | 50 g/m² Unbleached Kraft Paper | Al Foil |
| Polyolefin Resin Film Layer | 80 μm L-LDPE Resin Film | 50 g/m² Clay-Coated Paper | 80 μm Coextruded L-LDPE Resin Film | 80 μm L-LDPE Resin Film | 50 μm × 2 LDPE Resin Films |
| Fixation of Top Seal | Cellophane Adhesive Tape | 50 g/m² Clay-Coated Paper | 80 μm Coextruded L-LDPE Resin Film | 80 μm L-LDPE Resin Film | 50 μm × 2 LDPE Resin Films |
| Fixation of Bottom Seal | EVA Hot-Melt | 50 g/m² Clay-Coated Paper | 80 μm Coextruded L-LDPE Resin Film | 80 μm L-LDPE Resin Film | 50 μm × 2 LDPE Resin Films |
| Adhesive Layer | 15 μm L-LDPE | 50 g/m² Clay-Coated Paper | 80 μm Coextruded L-LDPE Resin Film | 80 μm L-LDPE Resin Film | 15 μm LDPE |
| Appearance | Silver | White | Silver | Brown | Brown |
| Influence upon Photographic Property | B | B-C | B | D | D |
| Tear Strength (MD) | 926 g | 968 g | 832 g | 1,016 g | 294 g |
| Dust Formation | A | B | A | D | D |
| Bag-Making Ability | A | A | A | B | D-E |
| Cost Ratio | 50 | 53 | 58 | 46 | 100 |

Evaluations in Table 1 were carried out as follows:

| A very excellent | B excellent |
|---|---|
| C practical | D having a problem |
| E impractical | |

Testing methods are as follows:

Influence upon Photographic Property:

A photographic film of ASA 100 was placed in respective gusset bags, and completely sealed. Each gusset bag was exposed to the light of 80,000 luxes for one hour, and the light-shielding ability was estimated by the fogging degree of the photographic film.

Tear Strength: JIS P-8116

Dust Formation:

A roll of color photographic printing paper being 8.9 cm in width and 180 m in length was placed in each gusset bag, and completely sealed as shown in FIG. 10. The gusset bag was packed in a corrugated board box in an actual transportation form, and as to the corrugated board box, vibration test was carried out according to JIS Z-0232. The resistant to dust formation ability was estimated by the degree of dust generation.

Bag-Making Ability:

Estimated by the surface-reverse side judging ability, workability for automatic bag-making, heat seal ability, dered paper, said flexible sheet layer being laminated on the outside of said metal foil layer or metallized flexible sheet layer, and a light-shielding polyolefin resin film layer containing linear low density polyethylene resin in an amount of more than 40 wt. %, a resin selected from the group consisting of homopolypropylene resin, propylene-ethylene random copolymer resin, propylene-ethylene block copolymer resin, LDPE resin, HDPE resin, EVA resin, EEA resin and polyisobutylene resin, carbon black and an antioxidant, said film layer having a thickness of more than 50 μm and being laminated on the inside of said metal foil layer or metallized flexible sheet layer, and the bottom seal portion is turned or rolled and fixed by an adhesive or adhesive tape.

2. The gusset bag as set forth in claim 1 wherein said light-shielding polyolefin resin film layer is one layer of a coextruded multilayer film layer, and disposed as the inner surface layer of the gusset bag.

3. The gusset bag as set forth in claim 2 wherein the layer coextruded with the light-shielding polyolefin resin film layer is composed of the resin selected from the group consisting of L-LDPE resin, LDPE resin, HDPE resin, MDPE resin, homopolypropylene resin, propylene-ethylene random copolymer resin, propylene-ethylene block copolymer resin, EVA resin, EEA resin, EAA resin, polyisobutylene resin, polyamide resin, saponified EVA resin, polybutene-1, polyester resin, ionomer resin, polyvinylidene chloride resin, polyacrylonitrile resin, polystyrene resin, a modified resin of one of these resins, a graft copolymer resin containing one of these resins, a crosslinked resin and a blended resin of two or more of the above resins.

4. The gusset bag as set forth in claim 1 wherein said bottom seal portion is turned.

* * * * *